United States Patent Office.

RANDALL FISH, OF WASHINGTON, DISTRICT OF COLUMBIA.

Letters Patent No. 93,607, dated August 10, 1869.

IMPROVED DEODORIZING-COMPOUND.

The Schedule referred to in these Letters Patent and making part of the same.

*To all whom it may concern:*

Be it known that I, RANDALL FISH, of Washington, in the county of Washington, and District of Columbia, have invented a new and valuable Improvement in Deodorizers; and I do hereby declare that the following is a full, clear, and exact description of the same.

My invention relates to deodorizers; and

It consists mainly in a novel compound of ingredients, intended to serve as efficient means for deodorizing human excrement and other offensive substances.

To sixteen pounds of peat-charcoal, peat-ashes, and dry peat, well pulverized, in about equal proportions, I add sixteen pounds of dry pulverized marl, four pounds of copperas, five pounds of gypsum, three pounds of coffee-grounds, or their equivalent in the solution of coffee, two pounds of chloride of sodium, and three ounces of the oil of almonds. These substances I mix thoroughly together, and my deodorizer is prepared for use. In case peat-charcoal cannot be obtained, wood-charcoal may be substituted therefor.

The proportions herein given are not intended to be made arbitrary, for they may be varied to a considerable extent, and still a good deodorizer secured. In case coffee-grounds, almond-oil, and salt are not easily to be obtained, they may be dispensed with, but I recommend their use when practicable.

What I claim as my invention, and desire to secure by Letters Patent, is—

The deodorizer, herein described, compounded in the manner, and of the ingredients, substantially as specified.

In testimony that I claim the above, I have hereunto subscribed my name, in the presence of two witnesses.

RANDALL FISH.

Witnesses:
J. M. HYNE,
S. CURRY.